UNITED STATES PATENT OFFICE.

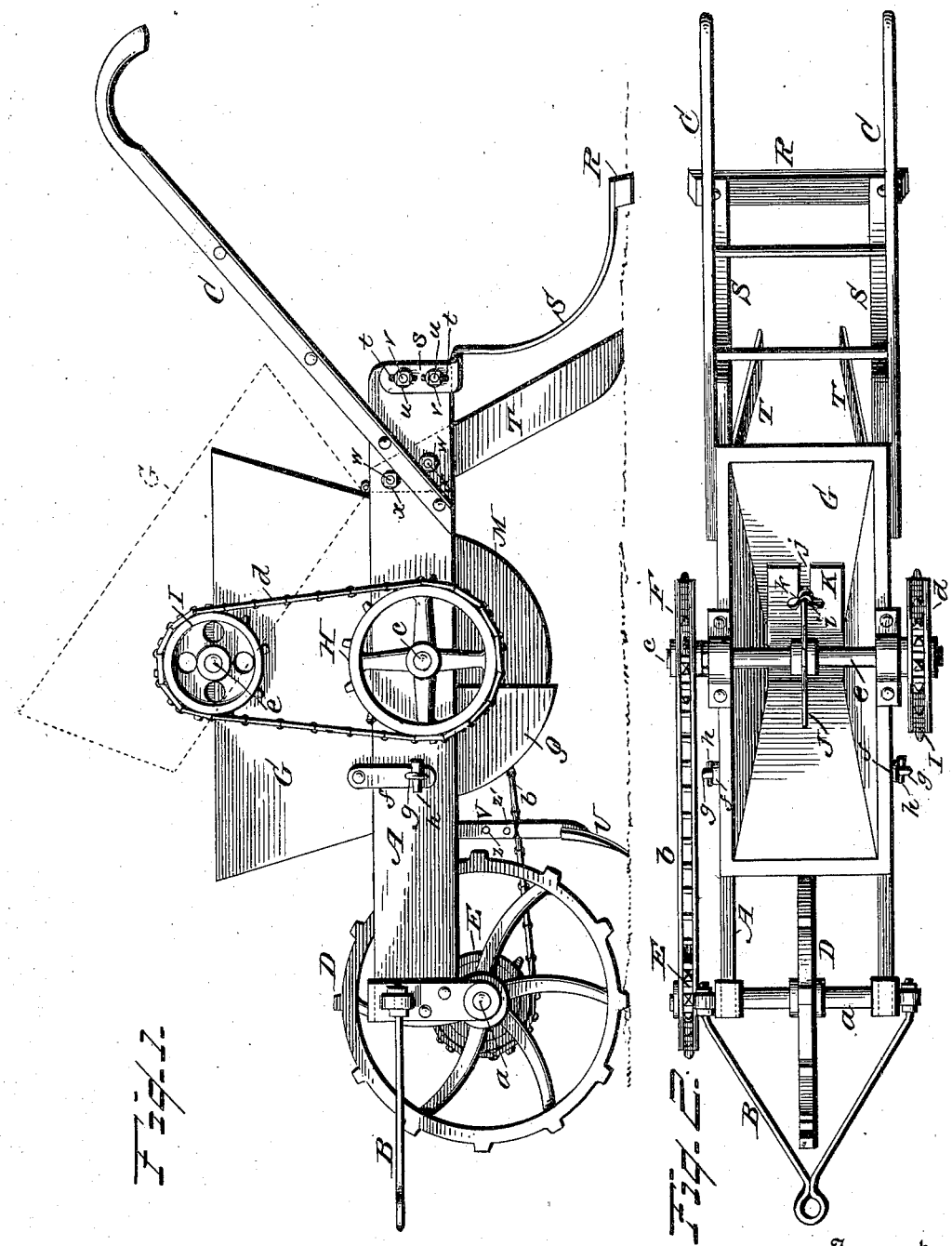

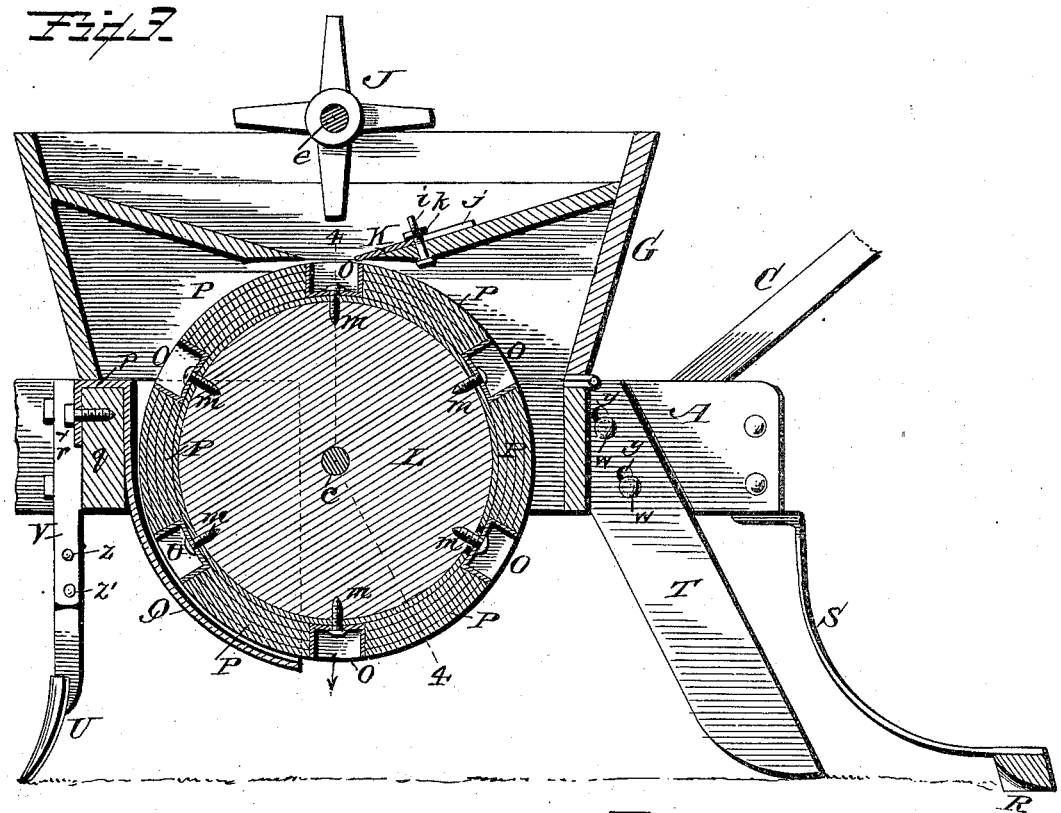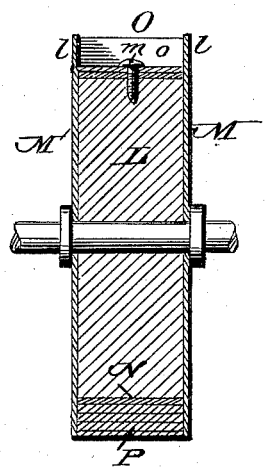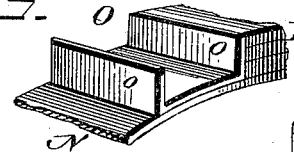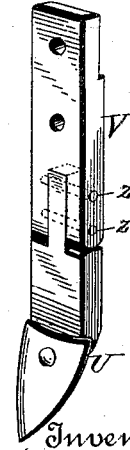

RICHARD S. BONNER, OF LITTLE ROCK, ARKANSAS.

COTTON-PLANTER.

SPECIFICATION forming part of Letters Patent No. 687,914, dated December 3, 1901.

Application filed August 14, 1901. Serial No. 71,976. (No model.)

*To all whom it may concern:*

Be it known that I, RICHARD S. BONNER, a citizen of the United States, residing at Little Rock, in the county of Pulaski and State of Arkansas, have invented certain new and useful Improvements in Cotton-Planters; and I do hereby declare that the following is a full, clear, and exact description of the same, reference being had to the annexed drawings, making a part of this specification, and to the letters of reference marked thereon.

The present invention has for its object to provide a cotton-planter that will be simple in construction, perfect in operation, and a planter that will sow the seed effectively and successfully without any material waste; and it consists in a planter constructed substantially as shown in the drawings and hereinafter described and claimed.

Figure 1 of the drawings is a side elevation of a cotton-planter constructed in accordance with my invention, the hopper being shown in a tilted position in dotted lines; Fig. 2, a top plan view thereof; Fig. 3, a sectional elevation on an enlarged scale; Fig. 4, a detail sectional elevation of the distributer-wheel, taken on line 4 4 of Fig. 3; Fig. 5, a detail perspective view of a portion of the band of the distributer-wheel, showing one of the buckets connected thereto. Fig. 6 is a detail perspective view of the furrow-opener.

In the accompanying drawings, A represents a frame of any suitable form and construction, which is provided at its respective ends with a draft-clevis B and the usual handles C. To the front of the frame A is suitably journaled a transverse shaft $a$, to which is connected the drive-wheel usually employed in planters, as shown at D, the shaft at one end having connected thereto a sprocket-wheel E, with which engages a sprocket-chain $b$. This sprocket-chain $b$ extends to and engages a sprocket-wheel F on one end of a transverse shaft $c$, which shaft has its bearings in the frame A below the hopper G. To the opposite end of the shaft $c$ is connected a sprocket-wheel H, with which engages a sprocket-chain $d$, said chain extending up and engaging a sprocket-wheel I upon a transverse shaft $e$. This shaft $e$ extends over the top of the hopper G and has its bearings in the side walls thereof and is provided with the usual agitator J.

The hopper G is hinged to the frame A, so that it can be lifted up and tilted back, as shown in dotted lines of Fig. 1 of the drawings, so as to obtain access to the distributer-wheel, hereinafter described. This hopper may be held down in place by any suitable means, such as hasps $f$, connected to the sides of the hopper and engaging staples $g$ on the frame A, the hasps being held in engagement with the staples by means of suitable keys $h$, or any other desirable means may be employed for holding the hopper stationary on the frame and admit of its being released when it is desired to elevate the hopper.

The interior of the hopper G is provided with the usual slide K to regulate the size of the opening of the hopper as circumstances may require, said slide being adjustably held to the hopper by means of a screw-bolt $i$, extending through an open slot $j$ in the slide, and a thumb-nut $k$, engaging the screw-threaded end of the bolt to hold the slide in its adjusted position. Any other suitable means may be employed for rendering the slide adjustable and holding it in its adjusted position, the means shown being one of many that may be used successfully.

To the rotatable shaft $c$ is connected the distributer-wheel, which comprises in part the circumferential core L, preferably of wood, and to the sides of the core or body are secured metal disks M, of greater diameter than the core or body, so as to present circumferential flanges $l$, as shown in Fig. 4 of the drawings. Over the periphery of the core or body L and between the flanges $l$ is secured a band N of leather or other flexible material, and to this band are connected the buckets O by means of screws $m$, which extend through the buckets and band and also into the core or body L, thereby detachably connecting the band to the core or body by means of said screws and admit of its removal when desired to substitute a band of different construction. The buckets O are formed of rectangular metal plates, which have their ends bent up at right angles to present flanges $o$, as shown in Fig. 5 of the drawings, the flanges $l$ of the metal disks M forming the sides of the buckets.

A very simple and effective distributer-wheel is provided when constructed as herein described, and to fill the spaces between the buckets O, so as to have the periphery of the wheel uniform and prevent the accumulation of seed thereon, I provide blocks P, of leather or other flexible material, that will conform to the curvature of the band N when bent around the core or body. A hood Q is provided to retain the seed in the buckets until the buckets arrive at the lowest or dropping position, as indicated by the arrow in Fig. 3 of the drawings, said hood having its upper end bent, so as to form a right-angle bracket $p$, to hook over the cross-beam $q$ of the frame A and held thereto by screws $r$.

The coverer-bar R is connected to spring-arms S, which arms are vertically adjustable upon the frame A by means of plates $s$ with slots $t$ and bolts $u$, extending through the slots, and nuts $v$, engaging the screw-threads on the bolts, said plates being integral with the spring-arms. The means shown for enabling the spring-arms to be vertically adjustable and held in their adjusted position may be variously modified or changed without in any manner affecting the principle thereof, and any convenient means may be employed that will admit the position of the coverer-bar to be regulated as circumstances require.

The knives T in front of the coverer-bar R are intended to run on each side of the furrow for the purpose of flushing or loosening the dirt behind the seed, so that the coverer-bar will cover the seed with loose fine dirt, that will cause no obstruction to the seed coming up. These knives T are adjustable, so as to increase or diminish their height with relation to the frame of the planter in order to regulate the depth to which the seed is to be planted and covered. The deeper the knives are run the more the dirt will be flushed to cover the seed. The same means may be employed to render the knives T adjustable as used in the spring-arms S. Simply the bolts $w$, nuts $x$, and the slots $y$ in the upper ends of the knives or any other preferred means may be employed, as found most desirable.

The furrow-opener U is pivotally connected to the standard V by means of pivot $z$, the opener being held against pivotal action or, in other words, stationary with relation to the standard by means of a wooden key $z'$ or of any material that will break should the opener come against any obstruction.

The furrow-opener U when coming in contact with any hard obstruction, such as a stone, the pressure against the opener will cause the wooden key to break and release the opener and allow it to hang on its pivotal connection to pass over the obstruction without any injury being done, after which a new key of wood may be substituted for the broken one.

It is evident that many changes or modifications in the several details of construction may be made without departing from the principle of the invention.

The buckets O may be connected to the belt N at any angle and any distance apart, so that the seed may be dropped across the planter in any manner found desirable, as I do not wish to limit my invention to any particular form of bucket or any particular manner of connecting it to the belt, this being left entirely to circumstances and the uses to which the planter may be applied.

Having now fully described my invention, what I claim as new, and desire to secure by Letters Patent, is—

1. In a cotton-planter, a rotatable distributer comprising a solid core, a flexible band extending around the same and detachably connected thereto, buckets removably connected to the core and band thereof, and removable blocks interposed between the buckets, substantially as and for the purpose set forth.

2. A distributer-wheel for cotton-planters, comprising a solid core, a flexible band extending around the same and detachably connected thereto, buckets having right-angle flanges and open sides and connected to the band, blocks interposed between the buckets, and metal disks forming the sides of the core and also the side walls of the buckets, substantially as and for the purpose described.

In testimony that I claim the above I have hereunto subscribed my name in the presence of two witnesses.

RICHARD S. BONNER.

Witnesses:
ED CORNISH,
J. E. ENGLAND, Jr.